Sept. 25, 1962   J. P. GALLUS   3,055,208
DYNAMIC FILTER
Filed Sept. 22, 1959
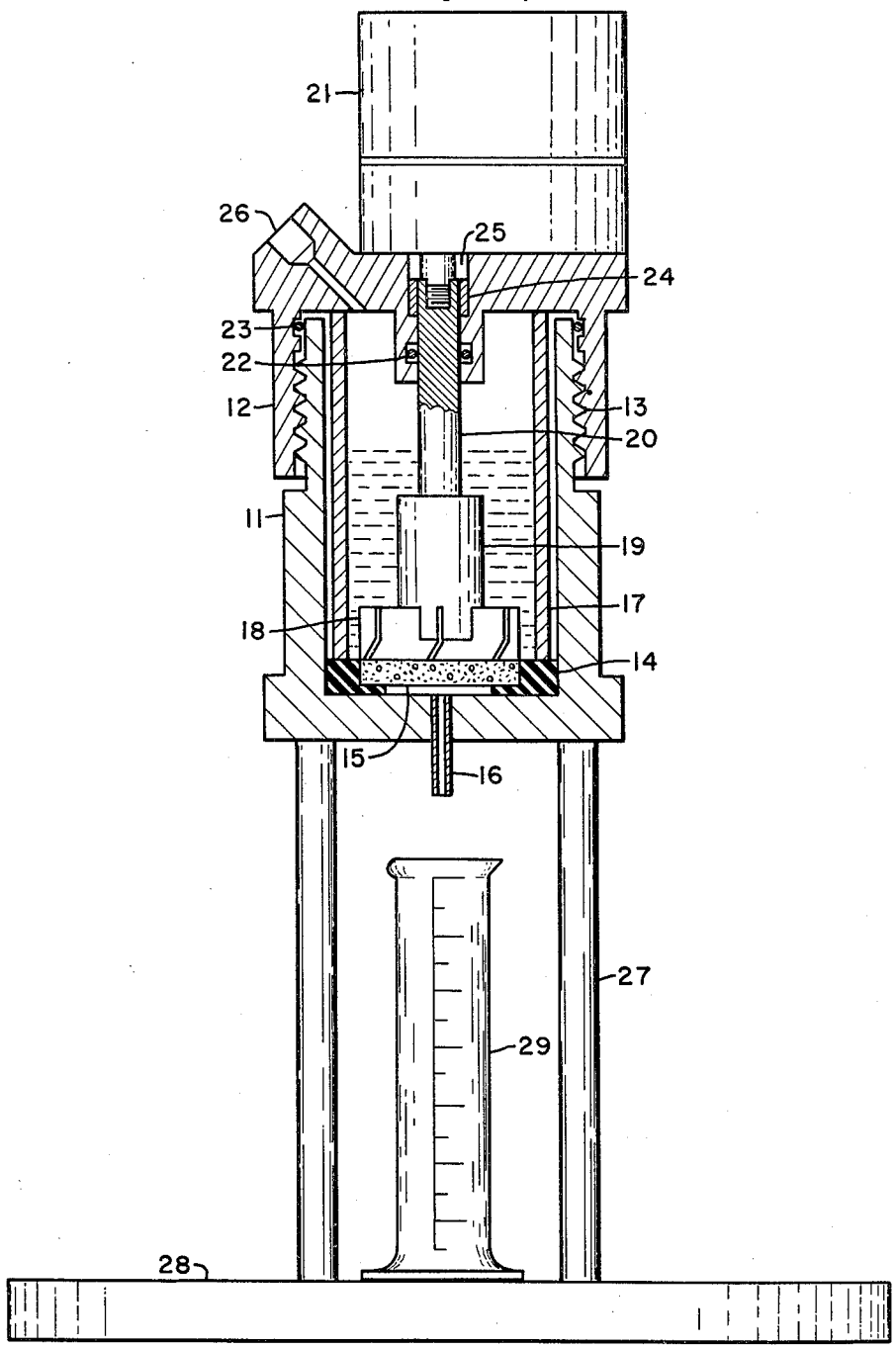
Julius P. Gallus   Inventor
By James E. Reed   Attorney United States Patent Office 3,055,208
Patented Sept. 25, 1962

3,055,208
DYNAMIC FILTER
Julius P. Gallus, Tulsa, Okla., assignor to Jersey Production Research Company, a corporation of Delaware
Filed Sept. 22, 1959, Ser. No. 841,629
3 Claims. (Cl. 73—53)

The present invention relates to apparatus for measuring the fluid loss characteristics of compositions employed in contact with subterranean formations and more particularly relates to an improved dynamic filter for determining the rate and extent to which fluids are lost to subsurface strata from drilling muds, cements, fracturing fluids and similar compositions employed in the drilling, completing and treating of oil and gas wells.

Muds used in drilling oil wells, gas wells and similar boreholes are generally suspensions of clay and finely-divided solids in oil or water. When such muds are contacted with subsurface strata during a drilling operation, a portion of the oil or water therein will usually be absorbed by the strata. Excessive loss of fluid from the mud in this manner may have serious consequences. Filtration into a producing formation will often reduce the permeability of the formation to such an extent that acid treating or perforation is necessary before the formation fluids can be effectively produced. In shales and other strata, filtration may cause the formation to slough to a point where the drill string becomes frozen in the borehole. Other effects include the distortion of electric log curves and core data. Similar difficulties are encountered due to fluid losses from cements, fracturing fluids, acidizing solutions and other compositions used in well drilling, completing and testing operations. Because of these difficulties, it is important that the fluid loss characteristics of the compositions used in such operations be controlled.

The method most widely used in the past for determining the fluid loss characteristics of drilling muds and similar compositions is one promulgated by the American Petroleum Institute and described in APL code R.P. 29, "Recommended Practice for Standard Field Procedure for Testing Drilling Muds," third edition, published at Dallas, Texas, in May 1950. In essence the test procedure involves measurement of the amount of filtrate which will pass through a prescribed filter paper from a quiescent body of drilling fluid under specified pressure conditions during a given period of time. Although this test is widely accepted, experience has shown that the results obtained bear little relationship to the fluid loss characteristics exhibited by the tested materials under actual service conditions. Many drilling fluids which give equal ratings under the static conditions of the API test vary widely in their fluid loss characteristic under the dynamic conditions prevailing during drilling operations. Efforts have been made to develop improved fluid loss characteristic testors but heretofore such efforts have not been markedly successful. In general apparatus suggested for use in the past has not given reliable results or has been too bulky and complex to permit its use under field conditions. For this reason, it has been the general practice to confine dynamic tests of the fluid loss characteristics of drilling fluids and similar compositions to the laboratory and to use the API test in the field despite its obvious shortcomings.

The present invention provides an improved dynamic filter for measuring the fluid loss characteristics of drilling muds, cements, fracturing fluids, acidizing solutions and similar compositions employed in well drilling, treating and completing operations. The apparatus of the invention utilizes a rock specimen of known permeability through which the composition to be tested may be filtered under conditions which closely approximate the dynamic condition prevailing during field use of such compositions. Rotating wiper blades mounted upon a motor-driven shaft continuously move across the surface of the specimen, dislodging the filter cake as it is formed and effecting the filter action in much the same manner that the drill bit and rotating drill string effect fluid losses during actual drilling operations. The rock specimen utilized is mounted within a pressure chamber in a manner such that the filtrate passing through the specimen during selected time intervals can readily be collected and measured.

The use of a rock specimen in the apparatus of the invention in place of the filter paper or similar filter media utilized in the past gives results considerably more reliable than those obtained heretofore. By employing specimens having permeabilities and other properties equivalent to those of the strata of interest, the fluid loss characteristics which the composition being tested will exhibit under service conditions can be accurately assessed. Moreover, the use of such specimens permits the testing of acid solutions and other compositions which cannot readily be tested when conventional filter devices are employed. The apparatus of the invention is inexpensive, easily maintained, readily portable, and can be operated by both laboratory and field personnel with little training. The invention thus provides a dynamic filter which is ideally suited for measuring the fluid loss characteristics of drilling muds, fracturing fluids, cements, acidizing solutions and similar compositions under field conditions and which possesses numerous advantages over devices utilized or suggested by the prior art.

The exact nature and objects of the invention can be best understood by referring to the following detailed description of a preferred embodiment of the apparatus and to the accompanying drawing illustrating that embodiment.

As can readily be seen from the drawing, the apparatus of the invention comprises a test cell having mounted therein a porous rock specimen over the surface of which motor-driven wiper blades may be rotated as the test composition filters through the specimen. The test cell itself includes a generally cylindrical, cup-shaped container 11 to which a head 12 may be attached by means of threads 13, bolts and flanges, or other suitable fluid-tight means. Container 11 and head 12 will normally be made of steel or cast iron but may be constructed of other materials capable of withstanding moderate pressures ranging up to about 1,000 pounds per square inch. The fluid loss characteristics of drilling muds, cements, and similar compositions may vary with variations in the pressure under which they are used and hence it is sometimes advisable to test such compositions under pressures which closely approximate service conditions.

Disposed within and at the bottom of container 11 is fitting 14 which is designed to support the rock specimen 15 utilized as the filter medium in the apparatus of the invention. Fitting 14 is made of rubber, plastic or similar compressable material resistant to attack by acids and other chemicals employed in well drilling and well treating operations. The fitting is an annular element having dimensions such that it will fit tightly between the walls of container 11 and rock specimen 15 and prevent the test fluid from leaking past the specimen. The specimen itself is preferably, a smooth disc of sandstone, limestone, shale or other rock with respect to which the fluid loss characteristics of the test fluid are to be determined. A suitable disc may be from about two to about four inches in diameter and from about one-half to about one inch in thickness. It will be understood that these dimensions are merely given by way of example and are not intended to limit the size of the rock specimen utilized. It will normally be found convenient to design the apparatus for use with a disc having a diameter the same as the diameter of cores cut by conventional core bits. Such cores can readily be sawed into sections in order to prepare filter discs for use in the apparatus. The permeability of the specimen should be determined before it is used in the apparatus in order that results obtained in the test may be properly assessed. Any of the conventional methods for measuring the permeability of the cores and similar rock samples may be used. Such methods are well known to those skilled in the art and need not be discussed in detail in the present disclosure.

Discharge tube 16 is provided at the bottom of container 11 in order to permit the collection and measurement of the test composition passing through rock specimen 15 during a prescribed period of time. It will be noted that the specimen is supported a short distance above the bottom of container 11 so that liquid can flow across the bottom of the container into the discharge tube. The bottom of the container may be tapered downwardly toward the tube in order to prevent any liquid from remaining within the space beneath the specimen at the conclusion of the test. In lieu of supporting the specimen in this manner, a series of grooves or indentations leading into the discharge tube may be provided in the bottom of the container. In either case the filtrate passing through the rock specimen will be free to flow into the discharge tube. The tube may be brazed, shrink-fitted or otherwise permanently inserted in the bottom of container 11 as shown in the drawing or may instead be threaded therein so that it can be removed.

Liner 17 is positioned within container 11 and rests upon fitting 14. The liner is a hollow cylindrical member of slightly smaller diameter than the inside of container 11 and has a wall thickness less than the width of the fitting 14. The liner extends above the upper edge of container 11 so that head 12 bears upon it when the head is tightened. This results in compression of the fitting when the head is tightened in place and assures the existance of a fluid-tight seal between the fitting and the wall of the container and between the fitting and the specimen when the apparatus is in use. If desired, the liner may be made of Teflon or other hard noncorrosive plastic in order to prevent scaling of the apparatus during the testing of fracturing fluids and other highly corrosive materials. A flat disc of similar material may be placed beneath fitting 14 around discharge 16 in order to protect the bottom of container 11. In lieu thereof, the inner surface of the liner in the bottom of the container may be coated with a layer of plastic or other acid-resistant material.

Wiper blades 18 mounted upon blade head 19 extend downwardly onto the upper surface of disc 15 within container 11. The blades are preferably made of rubber or similar flexible material and may be stiffened by wire or other metallic inserts. Metallic blades may also be used. Regardless of the type employed, the blades should be stiff enough to exert a positive pressure on the surface of disc 15 and yet should be sufficiently flexible that they will not dig into or abrade it. They should be wide enough to cover substantially the entire surface of the disc as they rotate. Although eight blades are employed on the apparatus as shown in the drawing, a greater or lesser number may be utilized. As in the case of the liner and the bottom of container 11, the blade head and the blades, if they are made of metal, may be provided with a corrosion-resistant coating.

Blade head 19 is supported upon shaft 20 which extends through a central opening in head 12 and is detachably connected to the shaft of motor 21. An O-ring of rubber or plastic or a similar sealing means 22 is provided in order to insure a fluid-tight seal between shaft 20 and head 12. Similar sealing means 23 are provided between the inner surface of the head and the outer surface of container 11 above threads 13. A bearing 24 positioned in well 25 in the head supports the shafts above O-ring 22.

Electric motor 21 is mounted atop head 12. The motor is preferably a fractional horse power synchronous motor provided with reduction gears so that the shaft and blades turn at a substantially constant speed of from about 4 to about 60 revolutions per minute. Other type motors whose speed can be controlled by suitable external means may also be utilized. Head 12 is fitted with pressure connection 26 through which air, nitrogen or similar gas may be introduced into the apparatus in order to effect the desired test pressure. A small gas cylinder will normally be utilized to provide the pressurizing gas. A pressure gage may be mounted on head 12 to measure pressure in the apparatus if desired.

As shown in the drawing, the apparatus is mounted upon stanchions 27 and base plate 28. Graduated cylinder 29 is provided to receive filtrate passing from discharge tube 16.

In utilizing the apparatus shown in the drawing, head 12 is first removed from the apparatus, along with the motor, shaft and blades, and a porous rock disc of known permeability is inserted in the bottom of container 11 in the recess provided by fitting 14. A measured amount of the composition to be tested is poured into the apparatus. The amount of test material should be substantially the same in each test. A mark may be provided on the inner wall of liner 17 to insure that the proper amount of fluid is used. The head and associated elements are then replaced. A cylinder of nitrogen or other gas fitted with a pressure gage and appropriate valves is connected to the filter through pressure connection 26. The valve on the gas cylinder is open until the desired filter pressure is obtained. The motor is then started. Filtrate discharged from the filter through tube 16 is collected over a predetermined period of time, thirty minutes for example, and is measured. The amount of filtrate so collected is an accurate indication of the fluid loss characteristics of the composition tested. As indicated earlier, a series of filter discs may be utilized to determine the fluid loss characteristics of the test fluid with respect to various types of strata. These discs may be reused if care is taken to remove all filtered material from previous tests from them. An effective means for cleaning the used discs is to insert them in the filter in inverted position and filter water through them at high pressure for an extended period of time. Any residue remaining from earlier tests can usually be removed in this way. It is generally necessary to redetermine the permeability of the discs before they are reused.

The apparatus of the invention may be employed for determining the filter loss properties of drilling fluids, cements, fracturing fluids, acidizing solutions and similar compositions used in the drilling, completing and treating of wells and boreholes. A particular advantage of the apparatus lies in the fact that its simplicity and portability readily permit its use in the field for controlling the composition and properties of such fluids. It is also valuable for laboratory purposes, however, and will find wide application therefor screening out and eliminating compositions having undesirable properties.

It will be recognized by those skilled in the art that many modifications in the specific apparatus shown in the drawing may be made without departing from the scope of the invention.

What is claimed is:

1. A dynamic filter for determining the filtration characteristics of fluids used in wells and boreholes which comprises in combination a vessel containing a chamber provided with a removable head, an annular elastic member for mounting a porous disc of rock in fluid-tight relationship to the wall of said chamber near the bottom thereof, a tubular chamber liner held in place against the upper surface of said elastic member by said removable head, a conduit for withdrawing filtrate from the bottom of said chamber, a motor mounted upon the head of said chamber, a shaft driven by said motor extending through the head of said chamber, wiper blades mounted on said shaft and positioned to move over the upper surface of a rock disc mounted in said elastic member as fluid filters downwardly through said rock disc, and a conduit in the head of said chamber for introducing a gas thereinto.

2. A dynamic filter for determining the filter characteristics of fluids used in wells and boreholes which comprises in combination a vessel containing a chamber provided with a removable head, a resilient ring positioned against the wall of said chamber near the bottom thereof, a porous disc of rock mounted within said resilient ring, a tubular liner held in position against the upper surface of said ring about said disc whereby said ring is forced in fluid-tight position between said disc and the wall of said chamber, a conduit for withdrawing filtrate from beneath said disc, a motor mounted upon the head of said vessel, a shaft rotated by said motor extending through the head of said vessel, wiper blades mounted on said shaft in contact with said disc, whereby said blades can be rotated as fluid filters downwardly through said disc, and a conduit in the head of said vessel whereby gas may be introduced into said chamber.

3. A dynamic filter for determining the filter characteristics of fluids used in wells and boreholes which comprises in combination a vessel containing a chamber provided with a removable head, said vessel including an injection port for introducing fluid into the upper part of said chamber and a discharge port for withdrawing fluid from the lower part of said chamber; an elastic member positioned within said chamber intermediate said injection and discharge ports, said elastic member fitting closely against the wall of said chamber and containing a circular opening within which a porous rock disc may be mounted with one face of said disc exposed to the upper part of said chamber and the other face of said disc exposed to the lower part of said chamber; means for compressing said elastic member about a rock disc mounted in said opening to effect a fluid-tight seal about said disc; a motor mounted on the head of said vessel; a shaft driven by said motor extending through the head of said vessel; and wiper blades mounted on said shaft and positioned to move over the upper surface of a rock disc mounted in said opening in said elastic member as fluid filters downwardly through said rock disc.

References Cited in the file of this patent

UNITED STATES PATENTS

| | | |
|---|---|---|
| 724,944 | Roberts | Apr. 7, 1903 |
| 2,089,702 | Lomax | Aug. 10, 1937 |
| 2,646,678 | Standing et al. | July 28, 1953 |
| 2,733,595 | Twining | Feb. 7, 1956 |
| 2,909,286 | Norell | Oct. 20, 1959 |